UNITED STATES PATENT OFFICE 2,671,095

11 BETA, 17 ALPHA-DIHYDROXYPREGNAN-20-ONES AND PROCESS

Robert H. Levin, Barney J. Magerlein, and Arthur R. Hanze, Kalamazoo, Mich., assignors to The Upjohn Company, Kalamazoo, Mich., a corporation of Michigan No Drawing. Application March 20, 1952,
Serial No. 277,724

19 Claims. (Cl. 260—397.45)

The present invention relates to the synthesis of certain steroid compounds, and is more particularly concerned with the novel compounds, 3-substituted-11β,17α-dihydroxypregnan-20-ones, and to a process for the production thereof.

It is an object of the present invention to provide the novel compounds, 3-substituted-11β,17α-dihydroxypregnan-20-ones. A further object of the invention is the provision of a process for the production of 3-substituted-11β,17α-dihydroxypregnan-20-ones. Another object of the present invention is to provide a means, through the formation of a ketal, whereby the 20 position of a 3-substituted-17α-hydroxypregnane-11,20-dione is blocked so that it is non-reactive while reduction of the 11-ketone is accomplished. Other objects of the invention will be apparent to one skilled in the art to which this invention pertains.

The novel compounds of the present invention may be represented by the following structural formula:

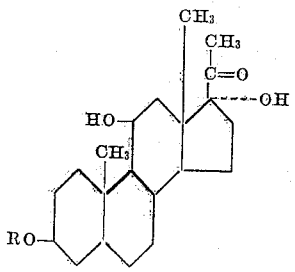

wherein RO includes the 3α- and 3β- configurations and wherein R is selected from the group consisting of hydrogen and the acyl radical of an organic carboxylic acid, especially such acids containing from one to eight carbon atoms, inclusive.

The novel compounds of the present invention are useful in the synthesis of physiologically active steroids such as cortisone and Kendall's Compound F and are of more general interest in the synthesis of 11β-hydroxy steroids, in addition to having certain physiological activity per se. For example, Kendall's Compound F acetate is prepared from the 3,11β,17α-trihydroxypregnan-20-ones of the present invention by first brominating the 3,11β,17α-trihydroxypregnan-20-one, with bromine in chloroform, and then treating the thus-produced 21-bromide with potassium acetate in acetic acid to introduce the 21-acetoxy group. The thus-obtained 3,11β,17α-trihydroxy-21-acetoxypregnan-20-one is selectively oxidized at the 3-position by an Oppenaur oxidation and the resulting 3-keto compound is treated with bromine in acetic acid to give the 3-keto-4-bromo derivative, which on treatment with semicarbazide hydrochloride results in the formation of the 3-semicarbazone with elimination of hydrogen bromide to form a double bond between carbon atoms four and five. Removal of the semicarbazone group with pyruvic acid gives Kendall's Compound F acetate. The 3-acyloxy-11β,17α-dihydroxypregnan-20-ones may be similarly converted to Kendall's Compound F acetate by first saponifying the 3-acyloxy group to a 3-hydroxy group with dilute sodium hydroxide.

The 11β-hydroxy compounds which are of particular interest are those compounds of the above generic formula wherein RO represents a 3-hydroxyl or an ester of the three hydroxy group with an organic carboxylic acid containing up to and including eight carbon atoms. Among such acids are formic, acetic, propionic, butyric, valeric, hexanoic, heptanoic, octanoic, cyclopentanoic, cyclohexanoic, cyclopentylpropionic, benzoic, toluic, and the like.

The novel starting compounds of the invention are the 3-substituted-17α-hydroxypregnane-11,20-dione 20-ketals of the following formula:

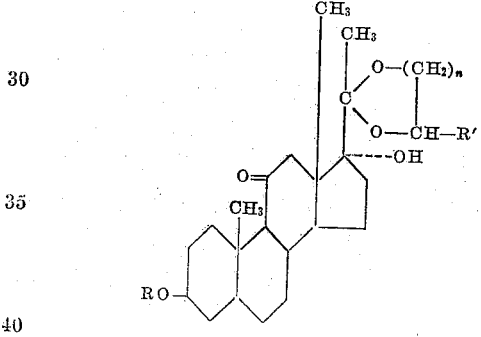

wherein RO includes the 3α- and 3β- configurations and wherein R is selected from the group consisting of hydrogen and the acyl radical of an organic carboxylic acid, especially such acids containing from one to eight carbon atoms, inclusive, and wherein R' is selected from the group consisting of hydrogen and lower alkyl groups, especially those containing from one to six carbon atoms, inclusive, such as, for example, methyl, ethyl, propyl, isopropyl, butyl, amyl, isoamyl, hexyl, and the like, and $n$ is an integer from one to two. They are usually obtained by heating a 3-hydroxy- or acyloxy-17α-hydroxypregnane-11,20-dione with a ketal forming agent, consisting of alkane-1,2-diols and alkane-1,3-diols such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol, and the like, in the presence of an acid catalyst such as, for example, para-toluenesulfonic acid, napthalenesulfonic acid, benzenesulfonic acid, ortho-chlorobenzenesulfonic acid, hydrochloric acid, and sulfuric acid, to convert the 20-ketone to a 20-ketal, and as more fully described in Preparation 5 through Preparation 13. 3α,17α-dihydroxypregnane-11,20-dione and 3-esters thereof can be prepared as described by Kritchevsky, Garmaise, and Gallagher in J. Am. Chem. Soc., 74, 483 (1952). 3β,17α-dihydroxypregnane-11,20-dione and 3-esters thereof are prepared from the known 3β-hydroxypregnane-11,20-dione [von Euw, Lardon, and Reichstein, Helv. Chim. Acta., 27, 821 (1944)] as described in Preparation 1 through Preparation 4.

According to the novel method of the present invention 3-hydroxy- or acyloxy-11β,17α-dihydroxypregnan-20-ones are prepared from starting 3-hydroxy- or acyloxy-17α-hydroxypregnane-11,20-dione 20-ketals by reduction of the 11-ketone group to an 11-hydroxy group using a mixed metal hydride, hydrogen and a catalyst, or other chemical reduction methods, to obtain 3-hydroxy- or acyloxy - 11β,17α - dihydroxypregnan-20-one 20-ketals. The 20-ketal group then is hydrolyzed to obtain a 20-ketone group and to produce the desired 3-hydroxy- or acyloxy-11β,17α-dihydroxypregnan-20-one.

In carrying out the novel process of the invention a starting 3-hydroxy- or acyloxy-17α-hydroxypregnane-11,20-dione 20-ketal is admixed with a solvent which is essentially non-reactive under the reaction conditions employed. The resulting admixture is then subjected to reduction using a mixed metal hydride such as, for example, lithium aluminum hydride, sodium borohydride, lithium borohydride, and the like. Alternatively, other chemical reducing agents, or hydrogen in the presence of a catalyst such as platinum, palladium on charcoal, Raney nickel, and the like, may be used. The exact nature of the solvent used depends in part on the solubility of the starting steroid, the reaction temperature desired, and the reducing agent employed. When mixed metal hydrides are used, solvents such as ether, tetrahydrofuran, benzene, alkanes, and the like, and sometimes water, are suitable. When other chemical methods for catalytic methods are used, solvents such as ether, dioxane, alcohol, and the like, and sometimes water, are suitable. In the preferred embodiment of the process, the starting steroid, dissolved in a non-reactive solvent such as, for example, benzene, is admixed with a mixed metal hydride, preferably lithium aluminum hydride, which previously has been admixed with a solvent such as, for example, ether.

During the reduction step the temperature of the reaction mixture is usually maintained between about zero and 100 degrees centigrade, with a temperature between about room temperature and the reflux temperature of the reaction mixture being preferred, for a reaction period varying from about one-half to about eight hours or more. When a mixed metal hydride, such as lithium aluminum hydride is used as the reducing agent, the reduction is advantageously first conducted at temperatures between about zero and fifty degrees centigrade, preferably at about room temperature, while during the latter phases of the reaction higher temperatures are utilized, the reflux temperature of the reaction mixture usually being the upper limit. Preferably the reactants are admixed and stirred for about one hour at room temperature and subsequently heated under reflux at the boiling point of the mixture, the total reaction time depending in part upon the ratio of the reactants and in part upon the temperature employed. Usually a substantial excess of the mixed metal hydride is employed, a one to 100-fold excess, or more, being operative, with a five to fifty-fold excess being preferred. When hydrogen and a catalyst are used as the reducing agent, the admixture of the starting compound, the solvent, and the catalyst are shaken with hydrogen until the theoretical amount of hydrogen has been absorbed. In most instances reduction using hydrogen at one to three atmospheres pressure at room temperature is entirely satisfactory but higher temperatures and higher pressures of hydrogen are also operative. When lithium aluminum hydride is used as the reducing agent, in addition to reduction of the 11-ketone, the ester group at the 3-position is converted to a hydroxy group. If it is desired to maintain the ester group at the 3-position, other reducing agents such as, for example, sodium borohydride, lithium borohydride or hydrogen with a catalyst may be utilized. Alternatively the product can be reacylated after reduction.

When reduction is substantially complete the excess reducing agent, if any, is destroyed. If a mixed metal hydride or other chemical reducing agent is used, such as, for example, lithium aluminum hydride, the excess lithium aluminum hydride is decomposed by adding, usually dropwise with stirring, a reagent such as water, wet ether, alcohol, alcohol-ether mixtures, aqueous alcohol, dilute aqueous hydrochloric acid, and the like, the reduction product remaining in the organic phase or solution. When catalytic reduction is used the catalyst is removed from the resulting solution by filtration. If desired, the 3-hydroxy- or acyloxy-11β,17α-dihydroxypregnan-20-one 20-ketal obtained by reduction may be isolated from the resulting organic solution by any conventional procedure such as, for example, by removing the solvent by distillation. Sometimes it is preferred not to isolate the reduction product since the solution from the reduction is usually of sufficient purity to be used in the second step of the process of this invention.

A solution of the 3-hydroxy- or acyloxy-11β,17α-dihydroxypregnan-20-one 20-ketal dissolved in an organic solvent such as those used previously during the reduction, which may be the solution obtained from the reduction step after removal of the catalyst or excess reducing agent, is admixed with a hydrolyzing agent. Usually an excess of a dilute aqueous solution of a mineral acid such as sulfuric acid, hydrochloric acid, and the like, is used as the hydrolyzing agent. In some instances acetic acid, other organic acids, other acidic agents, are suitable. A one to 100-fold excess, or more, of hydrolyzing agent is operative, with a five to ten-fold excess usually being preferred. Usually the reaction mixture is stirred for about 24 hours at room temperature. The reaction period may be longer or as short as one hour, depending in part on the ketal used, the reaction temperature, and the concentration of the hydrolyzing agent. Use of higher concentrations of hydrolyzing agent and higher temperatures usually reduces the reaction period, temperatures between about zero degrees centigrade and about the boiling point of the reaction mixture being operative. It is preferred to stir the reaction mixture if it consists of more than one phase.

When hydrolysis is substantially complete, the product is isolated by any conventional procedure. For example, when the resulting mixture is composed of an organic layer and a water layer, the organic layer is separated, the water layer is extracted with an organic solvent and the extracts combined with the organic layer. The organic phase is then washed with water and dried using a drying agent such as anhydrous sodium sulfate. Filtration to remove the drying agent and distillation to remove the solvent gives the isolated product. Recrystallization from any of the common solvents results in purification of the product.

The following examples illustrate the method and products of the present invention but are not to be construed as limiting.

PREPARATION 1.—3β-ACETOXYPREGNANE-11,20-DIONE

3β-hydroxypregnane-11,20-dione (8.18 grams) was dissolved in a mixture of fifty milliliters of acetic anhydride and two milliliters of pyridine, and the resulting solution was allowed to stand at room temperature for 24 hours. The mixture was then poured into 325 milliliters of water and allowed to stand at room temperature for several hours to permit decomposition of the excess acetic anhydride. The solid product was removed by filtration and dried under vacuum. Two recrystallizations from aqueous acetone gave 2.75 grams, melting point 155 to 162 degrees centigrade. Repeated recrystallization from aqueous acetone gave 3β-acetoxypregnane-11,20-dione melting at 164 to 165 degrees centigrade; $[\alpha]_D^{24}$ plus 99 degrees (chloroform).

Analysis: Per cent calculated for $C_{23}H_{34}O_4$: C, 73.90; H, 9.10. Found: C, 73.69; H, 9.02.

PREPARATION 2.—3β,11,20-TRIACETOXY-9(11),17(20)-PREGNADIENE

A mixture of 2.75 grams of 2β-acetoxypregnane-11,20-dione, 0.73 gram of para-toluenesulfonic acid monohydrate, and ninety milliliters of acetic anhydride was heated to boiling and allowed to distil slowly for three hours, 71 milliliters of distillate being collected. Another fifteen milliliters of distillate was collected by distillation under reduced pressure, and the resulting residue was cooled, diluted with 85 milliliters of ether, washed with one per cent aqueous sodium bicarbonate solution and with water, and dried over anhydrous sodium sulfate. After removing the drying agent by filtration, the ether was removed by distillation giving 3.5 grams of 3β,11,20-triacetoxy-9(11),17(20)-pregnadiene as a glass.

PREPARATION 3.—17(20)-OXIDO-3β,11,20-TRIACETOXY-9(11)-PREGNENE

The 3.5 grams of 3β,11,20-triacetoxy-9(11),-17(20)-pregnadiene from Preparation 2 was dissolved in seventeen milliliters of chloroform and the resulting solution cooled to a temperature of zero to five degrees centigrade. A mixture of 170 milligrams of anhydrous sodium acetate and 7.7 milliliters of 38 per cent peracetic acid was added with stirring, the temperature of the reaction mixture being maintained at zero to five degrees centigrade. The resulting mixture was stirred at this temperature for ten minutes, then allowed to come to room temperature, and stirred for an additional ninety minutes. The mixture then was diluted with eighty milliliters of ether, washed with four fifteen-milliliter portions of five per cent aqueous sodium hydroxide solution and three fifteen-milliliter portions of water, and dried over anhydrous sodium sulfate. Removal of the drying agent by filtration and distillation of the solvents under reduced pressure gave 3.5 grams of 17(20)-oxido-3β,11,20-triacetoxy-9(11)-pregnene as a viscous oil.

PREPARATION 4.—3β,17α-DIHYDROXYPREGNANE-11,20-DIONE

The 17(20)-oxido-3β,11,20-triacetoxy-9(11)-pregnene from Preparation 3 (3.5 grams) was dissolved in 66 milliliters of alcohol, 66 milliliters of 0.5 normal aqueous sodium hydroxide solution added, and the resulting mixture stirred for thirty hours at room temperature under a nitrogen atmosphere. The mixture then was poured into 250 milliliters of water, and the resultant slurry extracted with four fifty-milliliter portions of chloroform. Distillation of the extraction solvent gave 2.74 grams of crude 3β,17α-dihydroxypregnane-11,20-dione. The 3-acetate was prepared by acetylation with acetic anhydride and pyridine at room temperature.

PREPARATION 5.—3α,17α-DIHYDROXYPREGNANE-11,20-DIONE 20 ETHYLENE GLYCOL KETAL

A mixture of 260 milligrams of 3α,17α-dihydroxypregnane-11,20-dione, five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water which formed was removed by co-distillation with benzene and was collected in the water trap. The reaction mixture was cooled and poured into a dilute solution of sodium bicarbonate. The benzene layer was separated, washed with water, dried and concentrated to dryness. The residue was chromatographed over forty grams of Florisil (synthetic magnesium silicate) using eighty-milliliter portions of a mixture of ethylene dichloride with successively greater proportions of acetone for elution. The material which was eluted with ethylene dichloride-acetone (12:1 and 8:1) weighed 141 milligrams after removal of the solvents. Recrystallization of this material from benzene-Skelly Solve B yielded fifty milligrams of 3α,17α-dihydroxypregnane-11,20-dione 20-ethylene glycol ketal melting at 144 to 146 degrees centigrade.

Analysis: Per cent calculated for $C_{23}H_{36}O_5$: C, 70.37; H, 9.25. Found: C, 70.65; H, 9.28.

PREPARATION 6.—3α,17α-DIHYDROXYPREGNANE-11,20-DIONE 20-PROPANE-1,2-DIOL KETAL

In the same manner as given in Preparation 5, 3α,17α-dihydroxypregnane-11,20-dione 20-propane-1,2-diol ketal is prepared using a mixture of 1.5 millimoles of 3α,17α-dihydroxypregnane-11,20-dione, 28 millimoles of propane-1,2-diol, fifty milligrams of para-toluenesulfonic acid monohydrate and fifty milliliters of benzene.

PREPARATION 7.—3α,17α-DIHYDROXYPREGNANE-11,20-DIONE 20-BUTANE-1,2-DIOL KETAL

In the same manner as given in Preparation 5, 3α,17α-dihydroxypregnane-11,20-dione 20-butane-1,2-diol ketal is prepared from 3α,17α-dihydroxypregnane-11,20-dione by using butane-1,2-diol instead of ethylene glycol as the ketal forming agent and using sulfuric acid instead of para-toluenesulfonic acid as the catalyst.

PREPARATION 8.—3α,17α-DIHYDROXYPREGNANE-11,20-DIONE 20-(3-METHYLPENTANE-1,2-DIOL) KETAL

In the same manner as given in Preparation 5, 3α,17α-dihydroxypregnane-11,20-dione 20-(3-methylpentane-1,2-diol) ketal is prepared from 3α,17α-dihydroxypregnane-11,20-dione by using 3-methylpentane-1,2-diol instead of ethylene glycol and using naphthalenesulfonic acid instead of para-toluenesulfonic acid.

PREPARATION 9.—3α,17α-DIHYDROXYPREGNANE-11,20-DIONE 20-PROPANE-1,3-DIOL KETAL

In the same manner as given in Preparation 5, 3α,17α-dihydroxypregnane-11,20-dione 20-propane-1,3-diol ketal is prepared from 3α,17α-dihydroxypregnane-11,20-dione by using propane-1,3-diol in place of ethylene glycol.

PREPARATION 10.—3α-ACETOXY-17α-HYDROXYPREGNANE-11,20-DIONE 20-ETHYLENE GLYCOL KETAL

In the same manner as given in Preparation 5, 3α-acetoxy-17α-hydroxypregnane-11,20-dione 20-ethylene glycol ketal is prepared from 3α-acetoxy-17α-hydroxypregnane-11,20-dione by reaction with ethylene glycol in the presence of para-toluenesulfonic acid.

PREPARATION 11.—3α-BENZOYLOXY-17α-HYDROXYPREGNANE-11,20-DIONE 20-ETHYLENE GLYCOL KETAL

In the same manner as given in Preparation 5, 3α-benzoyloxy-17α-hydroxypregnane-11,20-dione 20-ethylene glycol ketal is prepared from 3α-benzoyloxy-17α-hydroxypregnane-11,20-dione by reaction with ethylene glycol in the presence of para-toluenesulfonic acid.

PREPARATION 12.—3β,17α-DIHYDROXYPREGNANE-11,20-DIONE 20-ETHYLENE GLYCOL KETAL

In the same manner as given in Preparation 5, 3β,17α-dihydroxypregnane-11,20-dione 20-ethylene glycol ketal is prepared from 3β,17α-dihydroxypregnane-11,20-dione by reaction with ethylene glycol in the presence of para-toluenesulfonic acid.

PREPARATION 13.—3β-ACETOXY-17α-HYDROXYPREGNANE-11,20-DIONE 20-ETHYLENE GLYCOL KETAL

In the same manner as given in Preparation 5, 3β-acetoxy-17α-hydroxypregnane-11,20-dione 20-ethylene glycol ketal is prepared from 3β-acetoxy-17α-hydroxypregnane-11,20-dione by reaction with ethylene glycol and using naphthalenesulfonic acid instead of para-toluenesulfonic acid.

In the same manner as described above in Preparation 5 through Preparation 13, other 20-ketals of 3,17α-dihydroxypregnane-11,20-dione and 3-acyloxy-17α-hydroxypregnane-11,20-dione are prepared, including the 20-(2-methylpropane-1,2-diol) ketal; 20-pentane-1,2-diol ketal; 20-hexane-1,2-diol ketal; 20-heptane-1,2-diol ketal; 20-octane-1,2-diol ketal; 20-butane-1,3-diol ketal; and the like.

Example 1.—3α,11β,17α-trihydroxypregnan-20-one

To a solution of two grams of lithium aluminum hydride in 200 milliliters of anhydrous ether was added dropwise, with stirring, two grams of 3α,17α-dihydroxypregnane-11,20-dione 20-ethylene glycol ketal in twenty milliliters of anhydrous benzene. The mixture was stirred at room temperature for one hour followed by boiling under reflux for an additional hour. With continued stirring the resulting mixture was cooled and treated cautiously with water added dropwise. The resulting solution, containing the 3α,11β,17α-trihydroxypregnan-20-one 20-ethylene glycol ketal, was admixed with an excess of dilute hydrochloric acid and the resulting heterogeneous mixture was stirred vigorously for twenty hours at room temperature. The product was isolated by separating the organic and aqueous layers, extracting the aqueous layer with ether, combining the ether extract with the organic layer, washing the organic solution twice with water, drying the washed solution over anhydrous sodium sulfate, removing the drying agent by filtration, and removing the solvents by distillation under reduced pressure. The resulting oily residue was dissolved in ethyl acetate, and diluted with Skelly Solve B to opalescence. On standing the solution deposited crystals which were removed by filtration and identified as the 11α-isomer (3α,11α,17α-trihydroxypregnan-20-one). Further dilution of the filtrate with Skelly Solve B gave 590 milligrams of 3α,11β,17α-trihydroxypregnan-20-one. An additional quantity of 3α,11β,17α-trihydroxypregnan-20-one was obtained from the remaining mother liquor by distillation of the solvents under reduced pressure, redissolving the residual oil in a minimum amount of ethyl acetate, and diluting with Skelly Solve B. The 590 milligrams of product was recrystallized once from a mixture of ethyl acetate and Skelly Solve B and once from a mixture of acetone and Skelly Solve B to give 275 milligrams of purified 3α,11β,17α-trihydroxypregnan-20-one as plates; melting point 213 to 216 degrees centigrade; $[\alpha]_D^{23}$ plus 73 degrees (acetone).

Analysis: Per cent calculated for $C_{21}H_{34}O_4$: C, 71.9; H, 9.71. Found: C, 72.1; H, 9.81.

In one experiment, before hydrolysis, the solution containing the 3α,11β,17α-trihydroxypregnan-20-one 20-ethylene glycol ketal was dried over anhydrous sodium sulfate, and the ether was distilled. Crystallization of the residue from a mixture of ethyl acetate and Skelly Solve B gave 3α,11β,17α-trihydroxypregnan-20-one 20-ethylene glycol ketal. Hydrolysis of the compound as described above, in ether, gave 3α,11β,17α-trihydroxypregnan-20-one which was identical with that obtained above.

Example 2.—3α,11β,17α-trihydroxypregnan-20-one

Following the procedure given in Example 1, 3α,17α-dihydroxypregnane-11,20-dione 20-ethylene glycol ketal is reduced with lithium borohydride instead of lithium aluminum hydride, to yield 3α,11β,17α-trihydroxypregnan-20-one.

Example 3.—3α-acetoxy-11β,17α-dihydroxypregnan-20-one

One hundred milligrams of 3α,11β,17α-trihydroxypregnan-20-one was dissolved in a mixture of 0.5 milliliter of acetic anhydride and 0.5 milliliter of pyridine, and the resulting solution was allowed to stand at room temperature for sixteen hours. The solution was then poured into a mixture of ice and water and the resulting mixture was allowed to stand for one hour at room temperature to permit decomposition of the excess acetic anhydride. The solid which had precipitated was filtered, washed with water, and dried under vacuum. Recrystallization from alcohol gave 75 milligrams of 3α-acetoxy-11β,17α- dihydroxypregnan-20-one; melting point 198 to 200 degrees centigrade.

Analysis: Per cent calculated for $C_{23}H_{36}O_5$: Acetyl, 10.7. Found: Acetyl, 10.2.

The same product is obtained by reducing 3α-acetoxy-17α-hydroxypregnane-11,20-dione 20-ethylene glycol ketal with sodium borohydride in dioxane and hydrolyzing with hydrochloric acid in essentially the same manner as described in Example 1.

*Example 4.—3α-benzoyloxy-11β,17α-dihydroxy-pregnan-20-one*

3α,11β,17α-trihydroxypregnan-20-one is converted to 3α-benzoyloxy-11β,17α-dihydroxypregnan-20-one by the procedure of Example 3 using benzoic anhydride in place of acetic anhydride.

The same product is obtained by reducing 3α-benzoyloxy-17α-hydroxypregnane-11,20-dione 20-ethylene glycol ketal with sodium borohydride in alcohol and hydrolyzing with hydrochloric acid in essentially the same manner as described in Example 1.

*Example 5.—3α,11β,17α-trihydroxypregnan-20-one*

3α,17α-dihydroxypregnane-11,20-dione 20-propane-1,2-diol ketal is converted to 3α,11β,17α-trihydroxypregnan-20-one using lithium aluminum hydride in ether followed by hydrolysis of the 3α,11β,17α-trihydroxypregnan-20-one 20-propane-1,2-diol ketal with dilute hydrochloric acid as in Example 1.

*Example 6.—3α,11β,17α-trihydroxypregnan-20-one*

3α,17α-dihydroxypregnane-11,20-dione 20-butane-1,2-diol ketal is converted to 3α,11β,17α-trihydroxypregnan-20-one using lithium aluminum hydride in ether followed by hydrolysis of the 3α,11β,17α-trihydroxypregnan-20-one 20-butane-1,2-diol ketal as in Example 1; dilute sulfuric acid being used as the hydrolyzing agent.

*Example 7.—3α,11β,17α-trihydroxypregnan-20-one*

3α,17α-dihydroxypregnane-11,20-dione 20-(3-methylpentane-1,2-diol) ketal is converted to 3α,11β,17α-trihydroxypregnan-20-one using sodium borohydride in dioxane as in Example 2, and hydrolyzing with dilute hydrochloric acid.

*Example 8.—3α,11β,17α-trihydroxypregnan-20-one*

3α,17α-dihydroxypregnane-11,20-dione 20-propane-1,3-diol ketal is converted to 3α,11β,17α-trihydroxypregnan-20-one by using the procedure of Example 1.

*Example 9.—3β,11β,17α-trihydroxypregnan-20-one*

Following the procedure of Example 1, 3β,17α-dihydroxypregnane-11,20-dione 20-ethylene glycol ketal is reduced with lithium aluminum hydride and subsequently hydrolyzed with dilute sulfuric acid to yield 3β,11β,17α-trihydroxypregnan-20-one.

*Example 10.—3β-acetoxy-11β,17α-dihydroxy-pregnan-20-one*

Following the procedure of Example 1, and using sodium borohydride in dioxane as the reducing agent, 3β-acetoxy-11β,17α-dihydroxypregnan-20-one is prepared from 3β-acetoxy-17α-hydroxypregnane-11,20-dione 20-ethylene glycol ketal. Alternatively the same compound is prepared by acetylation of 3β,11β,17α-trihydroxypregnan-20-one with acetic anhydride and pyridine.

In the same manner as described above in the examples, other 3,17α-dihydroxypregnane-11,20-dione and 3-acyloxy-17α-hydroxypregnane-11,20-dione 20-ketals, including those listed following Preparation 13, and the like, are converted to 3,11β,17α-trihydroxypregnan-20-one and 3-acyloxy-11β,17α-dihydroxypregnan-20-one with or without the isolation of the intermediate 11β-hydroxy ketals before hydrolysis.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. An 11β,17α-dihydroxypregnan-20-one having the following general formula:

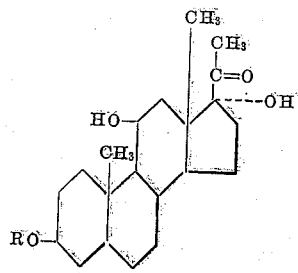

wherein RO includes the 3α- and 3β-configurations and wherein R is selected from the group consisting of hydrogen and the acyl radical of an unsubstituted monocarboxylic hydrocarbon acid containing from one to eight carbon atoms, inclusive.

2. 3α,11β,17α-trihydroxypregnan-20-one.
3. 3α-acetoxy-11β,17α-dihydroxypregnan-20-one.
4. 3β,11β,17α-trihydroxypregnan-20-one.
5. 3β-acetoxy-11β,17α-dihydroxypregnan-20-one.

6. A process for the production of an 11,17α-dihydroxypregnan-20-one which includes: (1) mixing together a reducing agent and a 17α-hydroxypregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, (2) hydrolyzing the product, and separating the thus-produced 11,17α-dihydroxypregnan-20-one.

7. A process for the production of an 11,17α-dihydroxypregnan-20-one which includes: (1) mixing together a reducing agent selected from the group consisting of lithium aluminum hydride, sodium borohydride and lithium borohydride, and a 17α-hydroxy-pregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, (2) hydrolyzing the product with a mineral acid, and separating the thus-produced 11,17α-dihydroxypregnan-20-one.

8. A process for the production of an 11β,17α-dihydroxypregnan-20-one which includes: (1) mixing together, in an organic solvent which is non-reactive under the condition of the reaction, a reducing agent selected from the group consisting of lithium aluminum hydride, sodium borohydride and lithium borohydride, and a 17α-hydroxypregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, (2) hydrolyzing the product with a hydrolyzing agent selected from the group consisting of sulfuric acid and hydrochloric acid, and separating the thus-produced 11β,17α-dihydroxypregnan-20-one.

9. A process for the production of an 11β,17α-dihydroxypregnan-20-one which includes: (1) mixing together, in an organic solvent which is non-reactive under the conditions of the reaction and at a temperature between about zero degrees centigrade and the reflux temperature of the reaction mixture, a reducing agent selected from the group consisting of lithium aluminum hydride, sodium borohydride and lithium borohydride, and a 17α-hydroxypregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, (2) hydrolyzing the product with a hydrolyzing agent selected from the group consisting of sulfuric acid and hydrochloric acid, and separating the thus-produced 11β,17α-dihydroxypregnan-20-one.

10. A process for the production of an 11β,17α-dihydroxypregnan-20-one which includes: (1) mixing together, in an organic solvent which is non-reactive under the conditions of the reaction and at a temperature between about zero degrees centigrade and the reflux temperature of the reaction mixture, a reducing agent selected from the group consisting of lithium aluminum hydride, sodium borohydride and lithium borohydride, and a 17α-hydroxypregnane-11,20-dione 20-ethylene glycol ketal, having a substituent at the 3-position of the formula RO, R being selected from the group consisting of hydrogen and the acyl radical of an organic monocarboxylic acid containing from one to eight carbon atoms, inclusive, (2) hydrolyzing the product with a hydrolyzing agent selected from the group consisting of hydrochloric acid and sulfuric acid, and separating the thus-produced 11β,17α-dihydroxypregnan-20-one.

11. A process for the production of a 3,11β,17α-trihydroxy-pregnan-20-one which includes: (1) mixing together, in an organic solvent which is non-reactive under the conditions of the reaction and at a temperature between about zero degrees centigrade and the reflux temperature of the reaction mixture, lithium aluminum hydride, and a 17α-hydroxypregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, (2) hydrolyzing the product with a hydrolyzing agent selected from the group consisting of hydrochloric acid and sulfuric acid, and separating the thus-produced 3,11β,17α-trihydroxypregnan-20-one.

12. A process for the production of 3α,11β,17α-trihydroxypregnan-20-one which includes: (1) mixing together, in an organic solvent which is non-reactive under the conditions of the reaction and at a temperature between about zero degrees centigrade and the reflux temperature of the reaction mixture, lithium aluminum hydride and 3α,17α-dihydroxypregnane-11,20-dione 20-ethylene glycol ketal, (2) hydrolyzing the product with a hydrolyzing agent selected from the group consisting of hydrochloric acid and sulfuric acid, and separating the thus-produced 3α,11β,17α-trihydroxypregnan-20-one.

13. A process for the production of 3α,11β,17α-trihydroxypregnan-20-one which includes: (1) mixing together, in an organic solvent which is non-reactive under the conditions of the reaction and at a temperature between about zero degrees centigrade and the reflux temperature of the reaction mixture, lithium aluminum hydride and 3α-acetoxy-17α-hydroxypregnane-11,20-dione 20-ethylene glycol ketal, (2) hydrolyzing the product with a hydrolyzing agent selected from the group consisting of hydrochloric acid and sulfuric acid, and separating the thus-produced 3α,11β,17α-trihydroxypregnan-20-one.

14. A process for the production of 3α,11β,17α-trihydroxypregnan-20-one which includes: (1) mixing together, in an organic solvent which is non-reactive under the conditions of the reaction and at a temperature between about zero degrees centigrade and the reflux temperature of the reaction mixture, lithium aluminum hydride and 3α,17α-dihydroxypregnane-11,20-dione 20-propane-1,2-diol ketal, (2) hydrolyzing the product with a hydrolyzing agent selected from the group consisting of hydrochloric acid and sulfuric acid, and separating the thus-produced 3α,11β,17α-trihydroxypregnan-20-one.

15. A process for the production of a 3-acetoxy-11β,17α-dihydroxypregnan-20-one which includes: (1) mixing together, in an organic solvent which is non-reactive under the conditions of the reaction and at a temperature between about zero degrees centigrade and the reflux temperature of the reaction mixture, sodium borohydride and a 3-acetoxy-17α-hydroxypregnane-11,20-dione 20-ethylene glycol ketal, (2) hydrolyzing the product with a hydrolyzing agent selected from the group consisting of hydrochloric acid and sulfuric acid, and separating the thus-produced 3-acetoxy-11β,17α-dihydroxypregnan-20-one.

16. In a process for the production of an 11β,17α-dihydroxypregnan-20-one, the step of reducing a 17α-hydroxypregnane-11,20-dione 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, in a solvent which is non-reactive under the conditions of the reaction, and at a temperature between about zero degrees centigrade and the reflux temperature of the reaction mixture; the reduction being accomplished with a reducing agent selected from the group consisting of lithium aluminum hydride, sodium borohydride and lithium borohydride.

17. In a process for the production of an 11β,17α-dihydroxypregnan-20-one, the step of hydrolyzing an 11β,17α-dihydroxypregnan-20-one 20-ketal, having a substituent at the 3-position of the formula RO, R being selected from the group consisting of hydrogen and the acyl radical of an organic monocarboxylic acid containing from one to eight carbon atoms, inclusive, wherein the ketal group contains the polymethylenedioxy radical of a compound selected from the group consisting of alkane-1,2-diols and alkane-1,3-diols containing from two to eight carbon atoms, inclusive, in a solvent which is non-reactive under the conditions of the reaction, and at a temperature between about zero degrees centigrade and the reflux temperature of the reaction mixture; the hydrolysis being accomplished with a hydrolyzing agent selected from the group consisting of sulfuric acid and hydrochloric acid.

18. A process for the production of an 11,17α-dihydroxypregnan-20-one which includes the steps of (1) mixing together an organic ketal-forming agent selected from the group consisting of alkane-1,2-diols and alkane-1,3-diols containing from two to eight carbon atoms, inclusive, and a 17α-hydroxypregnane-11,20-dione, having a substituent at the 3-position of the formula RO, R being selected from the group consisting of hydrogen and the acyl radical of an organic monocarboxylic acid containing from one to eight carbon atoms, inclusive, in the presence of an acid catalyst at a temperature between about twenty and about 200 degrees centigrade, to cause conversion of the 20-keto group to a 20-ketal group, and (2) reducing the 11-keto group of the ketal thus-formed with a reducing agent selected from the group consisting of lithium aluminum hydride, sodium borohydride, and lithium borohydride, in an organic solvent which is non-reactive under the conditions of the reaction at a temperature between about zero degrees centigrade and the reflux temperature of the reaction mixture, and (3) hydrolyzing the reduction product thus-obtained with a hydrolyzing agent, and separating the thus-produced 11,17α-dihydroxypregnan-20-one.

19. A process for the production of a 3,11β,17α-trihydroxypregnan-20-one which includes the steps of (1) mixing together ethylene glycol and 3,17α-dihydroxypregnane-11,20-dione, in the presence of an acid catalyst at a temperature between about twenty and about 200 degrees centigrade, to cause conversion of the 20-keto group to a 20-ketal group, and (2) reducing the 11-keto group of the ketal thus-formed with lithium aluminum hydride, in an organic solvent which is non-reactive under the conditions of the reaction at a temperature between about zero degrees centigrade and the reflux temperature of the reaction mixture, and (3) hydrolyzing the reduction product thus-obtained with a hydrolyzing agent selected from the group consisting of sulfuric acid and hydrochloric acid, and separating the thus-produced 3,11β,17α-trihydroxypregnan-20-one.

ROBERT H. LEVIN.
BARNEY J. MAGERLEIN.
ARTHUR R. HANZE.

No references cited.